(12) United States Patent
Bowman et al.

(10) Patent No.: US 9,824,513 B2
(45) Date of Patent: Nov. 21, 2017

(54) METHOD OF DETECTING ELEVATOR TAB FAILURE

(71) Applicant: UNITED AIRLINES, INC., Chicago, IL (US)

(72) Inventors: Paul Bowman, Kingwood, TX (US); Ryan Nurnberger, Chicago, IL (US)

(73) Assignee: UNITED AIRLINES, INC., Chicago, IL (US)

( * ) Notice: Subject to any disclaimer, the term of this patent is extended or adjusted under 35 U.S.C. 154(b) by 0 days.

(21) Appl. No.: 15/099,547

(22) Filed: Apr. 14, 2016

(65) Prior Publication Data

US 2017/0301155 A1 Oct. 19, 2017

(51) Int. Cl.
| | | |
|---|---|---|
| G06F 19/00 | (2011.01) | |
| G07C 5/08 | (2006.01) | |
| B64D 45/00 | (2006.01) | |
| B64C 13/40 | (2006.01) | |

(52) U.S. Cl.
CPC ............ *G07C 5/0816* (2013.01); *B64C 13/40* (2013.01); *B64D 45/00* (2013.01); *B64D 2045/0085* (2013.01)

(58) Field of Classification Search
CPC .............. G07C 5/0816; B64C 13/40
USPC ...... 701/33.7; 244/23 A, 23 B, 36, 211, 214, 244/215, 56, 179, 180, 181, 80, 90 R, 244/90 A; 71/33.7
See application file for complete search history.

(56) References Cited

U.S. PATENT DOCUMENTS

| | | | | |
|---|---|---|---|---|
| 2,556,353 A | * | 6/1951 | White | B64C 17/00 |
| | | | | 244/82 |
| 3,261,573 A | * | 7/1966 | Roberts | B64C 13/24 |
| | | | | 244/225 |
| 3,295,797 A | * | 1/1967 | Roberts | B64C 13/00 |
| | | | | 244/82 |
| 6,397,128 B1 | | 5/2002 | Todd | |
| 6,671,589 B2 | | 12/2003 | Holst et al. | |
| 7,359,777 B2 | | 4/2008 | Betters et al. | |
| 7,539,597 B2 | | 5/2009 | Wegerich et al. | |
| 7,945,360 B2 | | 5/2011 | Nahapetian | |
| 8,255,112 B2 | | 8/2012 | Conzachi et al. | |
| 8,266,066 B1 | | 9/2012 | Wezter et al. | |
| 8,660,743 B2 | * | 2/2014 | Aoki | B62D 5/0484 |
| | | | | 701/32.9 |
| 8,682,509 B2 | | 3/2014 | Goodrich et al. | |
| 8,798,811 B2 | | 8/2014 | Vial | |
| 8,798,817 B2 | | 8/2014 | O'Dell et al. | |
| 8,843,348 B2 | | 9/2014 | Pascu et al. | |

(Continued)

*Primary Examiner* — Muhammad Shafi
(74) *Attorney, Agent, or Firm* — Marshall, Gerstein & Borun LLP

(57) ABSTRACT

A method is provided for verifying proper operation of a left elevator tab disposed at an end portion of a left elevator of an aircraft and a right elevator tab disposed at an end portion of a right elevator of the aircraft. Because proper operation of the elevator tabs cannot be directly verified by existing aircraft instrument, the operation of the elevator tabs can be indirectly verified by analyzing flight data of the aircraft. After identification of a verification event, in which the elevator tabs move relative to the elevators, the positions of the left elevator and right elevator can be measured, and differences in the positions of the left elevator and right elevator can indicate proper operation of the left and right elevator tabs.

18 Claims, 9 Drawing Sheets

(56) References Cited

U.S. PATENT DOCUMENTS

| | | |
|---|---|---|
| 8,874,287 B2 | 10/2014 | Budan et al. |
| 8,880,278 B2 | 11/2014 | Ric et al. |
| 8,914,149 B2 | 12/2014 | Safa-Bakhsh et al. |
| 8,924,789 B2 | 12/2014 | Larsen et al. |
| 9,061,770 B2 | 6/2015 | Johnson et al. |
| 9,139,289 B2 | 9/2015 | Raynaud et al. |
| 9,156,567 B2 | 10/2015 | Covington et al. |
| 9,165,414 B2 | 10/2015 | Karnik et al. |
| 9,177,479 B2 | 11/2015 | Castillo-Effen et al. |
| 9,189,352 B1 | 11/2015 | deGaribody, Jr. et al. |
| 9,191,053 B2 | 11/2015 | Ziarno et al. |
| 2007/0219831 A1 | 9/2007 | Ne'meth |
| 2008/0039997 A1 | 2/2008 | Kolb et al. |
| 2008/0177439 A1 | 7/2008 | Betters et al. |
| 2008/0215196 A1* | 9/2008 | Deker .................. G05D 1/0607 701/5 |
| 2013/0138632 A1 | 5/2013 | Yost |
| 2013/0166135 A1 | 6/2013 | Dunsdon |
| 2013/0197739 A1 | 8/2013 | Gallagher et al. |
| 2014/0250042 A1 | 9/2014 | Chi et al. |

\* cited by examiner

METHOD OF DETECTING ELEVATOR TAB FAILURE

FIELD OF THE DISCLOSURE

This disclosure relates generally to detecting a latent fault in an aircraft control system, and in particular, to detecting a fault in the operation of elevator tabs used with an aircraft's elevator.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

The "Next Generation" 737 (the "737NG") was designed to fly higher, faster, carry heavier loads, and be more fuel efficient than its predecessor, the 737 Classic, which is manufactured by the Boeing Company. However, airlines flying the 737 Classic at the time of the planned upgrade wanted to limit changes to specific features of the 737 Classic to control costs associated with the upgrade. Specifically, the airlines wanted the 737NG to have the same type rating as the 737 Classic so that 737 Classic pilots would not need costly recertification to fly the 737NG. In addition, the airlines wanted the 737NG to have the same basic design and same airframe as the 737 Classic to utilize the same mechanics, tooling, and spare parts as the 737 Classic.

In accordance with this direction, the 737NG has the same—or nearly the same—airframe, wing area, and control surfaces as the 737 Classic, and the size of the 737 Classic elevators (a control surface on the horizontal tail wings of an aircraft that control pitch) were not changed on the larger and heavier 737NG. However, the 737NG has more powerful engines and higher gross weights than the 737 Classic, and the 737NG therefore requires more aerodynamic authority then the existing 737 Classic elevators were capable of developing. Consequently, with reference FIG. 2, engineers developed dual-functioning elevator tabs 10a, 10b that are disposed or positioned adjacent to a trailing edge of each elevator 12a, 12b on each horizontal stabilizer 14a, 14b of the 737NG and that are displaceable relative to the respective elevator 12a, 12b. During normal flight operations, the elevator tabs 10a, 10b may function in a "balance" mode (illustrated in FIGS. 4B and 4D) as a portion of the elevators 12a, 12b. However, the elevator tabs 10a, 10b are automatically reversed to an "anti-balance" function (illustrated in FIGS. 4A and 4C) to displace relative to each corresponding elevator 12a, 12b in two specific flight conditions: (1) hydraulics engaged; and (2) flaps not retracted.

The "balance" function of the elevator tabs 12a, 12b relates to the redundant flight control functions of the 737NG. The 737NG has two primary hydraulic systems, but the 737NG is capable of operating with one or even both of those hydraulic systems failed. In the case of dual failure of the hydraulic systems, the pilot can still control the 737NG by physical strength combined with the help of aerodynamic and mechanical devices and couplings. In such a scenario, and as illustrated in FIGS. 4B and 4D, the "balance" function of the elevator tabs 10a, 10b displaces the elevator tabs 10a, 10b in opposition to displacement of the elevators 12a, 12b. That is, when the elevator 12a, 12b (i.e., a trailing edge 28a, 28b of each elevator) pivots upwardly (as illustrated in FIG. 4B), the corresponding elevator tab 10a, 10b (i.e., the trailing edge of the elevator tabs 10a, 10b) pivots downwardly, and when the elevator 12a, 12b pivots downwardly (as illustrated in FIG. 4D), the corresponding elevator tab 10a, 10b pivots upwardly. This opposition movement applies an assisting load to the elevator surface allowing the pilot to move the elevator 12a, 12b when operating without hydraulic power. If the "balance" function of the elevator tabs 10a, 10b was to fail when required, the 737NG could not be manually controlled by a pilot.

A second elevator tab engagement scenario involves a takeoff from a runway with a limited length when an engine fails just after the aircraft has achieved $V_1$ speed (the speed reached during takeoff where it is just possible to stop the aircraft with the remaining distance of runway). If $V_1$ speed is exceeded, the aircraft is required to complete the takeoff or it will overrun the remaining runway if the takeoff is aborted. In such a takeoff, the elevator tabs 10a, 10b perform an "anti-balance" function in which the elevator tabs 10a, 10b displace in concert with the elevators 12a, 12b. That is, when the elevator 12a, 12b (i.e., the trailing edge of the elevator 12a, 12b) pivots upwardly, the corresponding elevator tab 10a, 10b (i.e., the trailing edge of the elevator tabs 10a, 10b) pivots upwardly (as illustrated in FIG. 4A), and when the elevator 12a, 12b pivots downwardly, the corresponding elevator tab 10a, 10b pivots downwardly (as illustrated in FIG. 4C). This in-concert displacement movement generates a greater elevator surface hinge moment than the elevator of a 737 Classic, thereby allowing the elevators 12a, 12b and elevator tabs 10a, 10b to rotate the aircraft before reaching the end of that runway. As with the "balance" function, if the "anti-balance" function was to fail when required, the aircraft would not have sufficient control authority to be assured of maintaining safe, continued flight.

While the elevator tabs perform a critical function in the two scenarios described above, the operation of the elevator tabs is entirely controlled by computer, and the pilots have no ability to manually or specifically control their operation. In addition, because the elevator tabs are not a part native to the 737 Classic, no instrumentation is connected to or in communication with the elevator tabs to directly detect failures, and the pilot (and flight computer) has no indication that the elevator tabs are functioning (or can function) properly. Accordingly, there is a need for a method or system to indirectly detect proper operation of the elevator tabs to ensure that the "balance" or "anti-balance" functions are available in an emergency.

BRIEF SUMMARY OF THE DISCLOSURE

Techniques are provided for assessing and verifying proper operation of a left elevator tab disposed at an end portion of a left elevator of an aircraft and a right elevator tab disposed at an end portion of a right elevator of the aircraft. The techniques include determining the occurrence of a verification event that includes movement of the left elevator tab relative to the left elevator and the right elevator tab relative to the right elevator, wherein the verification event occurs at a start time, wherein the left elevator is at an initial rotational position and the right elevator is at an initial rotational position at the start time. The techniques also include determining a first rotational position of the left elevator at a first time and a first rotational position of the right elevator at the first time, and the first time occurs after the start time. The first rotational position of the left elevator at the first time is compared to the first rotational position of the right elevator at the first time. If the first rotational position of the left elevator at the first time is not different than the first rotational position of the right elevator at the first time by at least a first value, a first alert is issued associated with the left elevator tab.

A second rotational position of the left elevator at a second time and a second rotational position of the right elevator at the second time are determined, and the second time occurs after the first time. The difference between the start time and the second time is equal to an intentional delay between functionality of the left elevator tab and the right elevator tab. The second rotational position of the left elevator at the second time is compared to the second rotational position of the right elevator at the elevator at the first time. If the second rotational position of the right elevator at the second time is not within a second range of the second rotational position of the left elevator at the second time, a second alert is issued associated with the right elevator tab. If (a) the second rotational position of the left elevator at the second time is within a third range of the initial rotational position of the left elevator at the start time and (b) the second rotational position of the right elevator at the second time is within the third range of the initial rotational position of the right elevator at the start time, a third alert is issued associated with both the left elevator tab and the right elevator tab.

DETAILED DESCRIPTION

Figure 1:
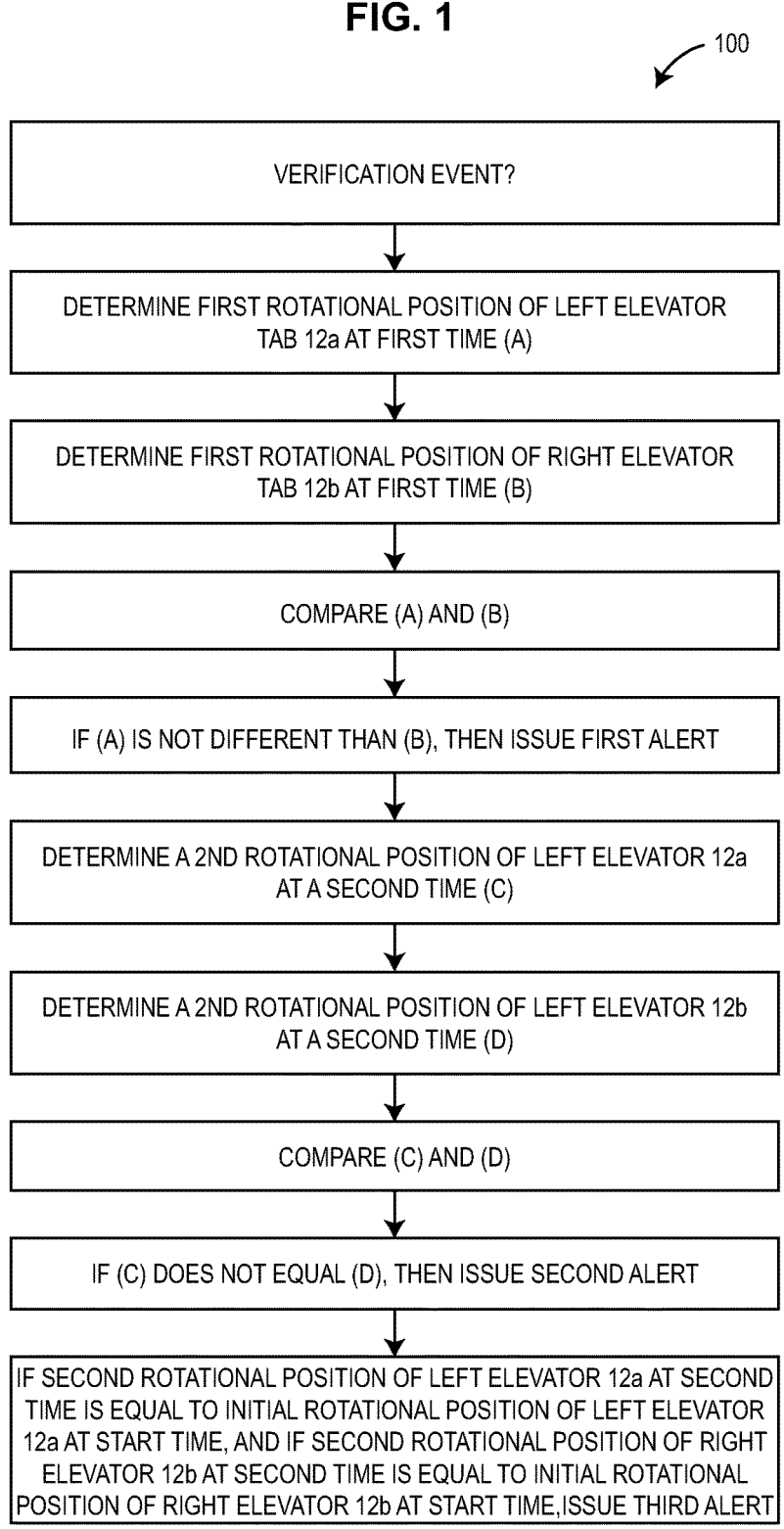
FIG. 1 is a schematic diagram of an embodiment of the method for verifying proper operation of a left elevator tab disposed at an end portion of a left elevator of an aircraft and a right elevator tab disposed at an end portion of a right elevator of the aircraft.

As illustrated schematically in FIG. 1, a method is provided for verifying proper operation of a first elevator tab (such as a left elevator tab) disposed at an end portion of a first elevator (such as a left elevator) of an aircraft and a second elevator tab (such as a right elevator tab) disposed at an end portion of a second elevator (such as a right elevator) of the aircraft. The provided method utilizes an intentional delay (e.g., a ten-second time delay) between the function of the left elevator tab and the subsequent function of the right elevator tab when the flaps are first extended. The techniques herein may be implemented by a flight diagnostic system such as that provided in FIG. 10 (discussed below). The techniques analyze flight data of the aircraft after one or more flights have been completed. The analysis involves automatic identification of a verification event, which may be the operation of the horizontal stabilizers of an aircraft and includes movement of the left elevator tab relative to the left elevator and the right elevator tab relative to the right elevator, wherein the verification event occurs at a start time. In an example, at the start of the verification event, the left elevator tab moves relative to the left elevator. However, due to the intentional delay, the right elevator tab does not move relative to the right elevator. Because the deployment of the left elevator tab relative to the left elevator creates aerodynamic forces, the left elevator immediately displaces relative to its position at or just prior to the initiation of the verification event. By contrast, the right elevator does not displace immediately after the initiation of the verification. Accordingly, by analyzing flight data, the diagnostic system can infer or detect a displacement of the left elevator tab following a verification event, by confirming that the left elevator immediately displaced (relative to both or either of its initial position or to the right elevator).

While examples herein are described in reference to movement of the left elevator tab preceding that of the right elevator tab, it is noted that the converse ordering may be implemented with the same results. The examples are described with the left elevator tab leading, because that corresponds to the present operation specifications of certain example aircraft.

At the expiration of the intentional delay, the right elevator tab displaces relative to the right elevator, and this displacement creates aerodynamic forces on the right elevator that immediately displaces the right elevator relative to its position at or just prior to the expiration of the intentional delay. By analyzing flight data, a displacement of the right elevator tab can be inferred or detected following the expiration of the intentional delay by confirming that the right elevator immediately displaced (relative to both or either of its initial position or to the left elevator). The techniques therefore allow the proper operation of the left elevator tab and the right elevator tab to be indirectly verified by data analysis of existing flight parameters, thereby avoiding the installation of costly new sensors, parts, and instrumentation.

Figure 2:
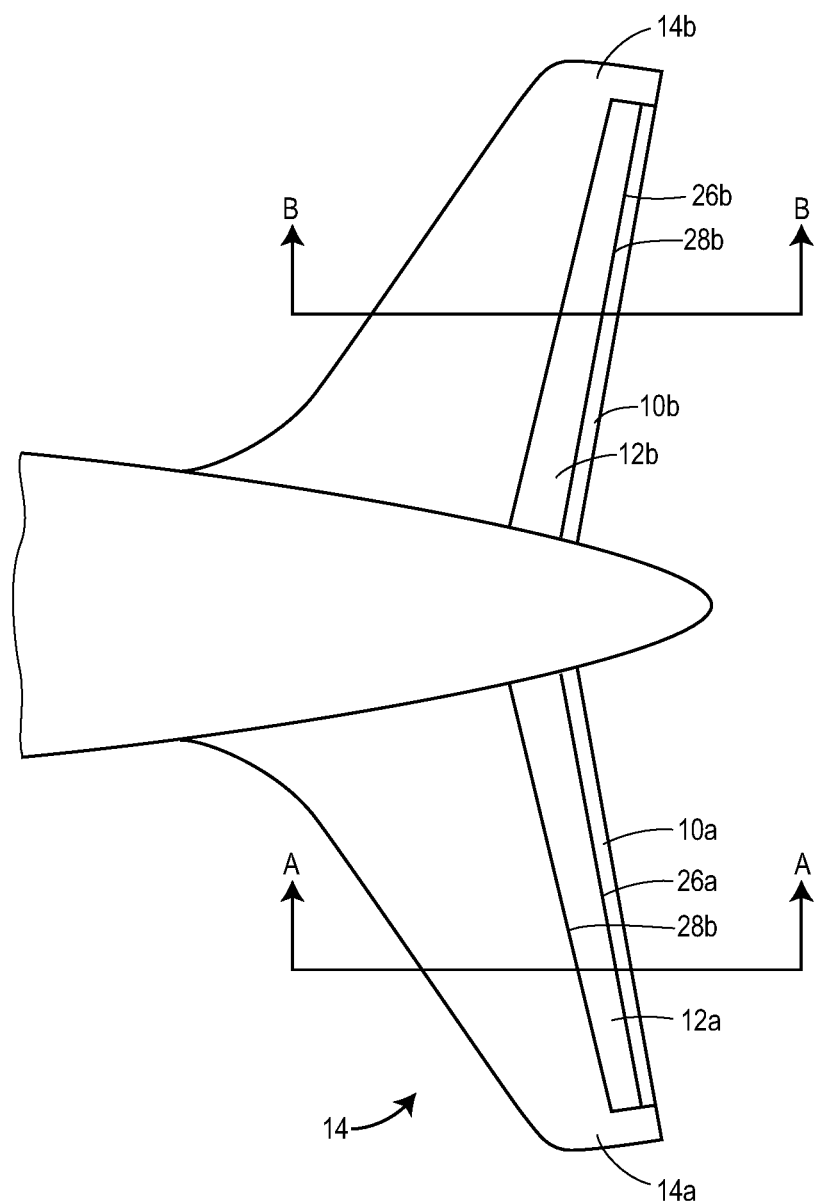
FIG. 2 is a partial plan view of a rear portion of an aircraft showing the horizontal stabilizers.

In an example implementation, available flight data (such as, for example, data from a Digital Flight Data Recorder ("DFDR") or a quick access recorder ("QAR")) is automatically analyzed by a diagnostic system (e.g., FIG. 10) that employs an elevator tab comparison algorithm to determine if a verification event has occurred during a flight of the aircraft. In response to triggering by a verification event, which may be an operation that involves movement of the left elevator tab 10a (see FIG. 2) relative to the left elevator 12a of the horizontal stabilizer 14 and the right elevator tab 10b relative to the right elevator 12b of the horizontal stabilizers, the system performs the assessment and verification. The diagnostic system, which may operate on historical available flight data or in real time on collected flight data, can identify a verification event typically on each flight. Because the operation of the elevator tabs 10a, 10b cannot be directly controlled (or monitored) by the pilot, the verification event is an operation of the elevators 12a, 12b that automatically involves the rotational displacement of the left and right elevator tabs 10a, 10b relative to the left and right elevators 12a, 12b, respectively. An example of a verification event may be, for example, a flight operation, such as moving the aircraft's flap control lever out of the "up" detent or disengaging either or both of the aircraft's redundant hydraulic systems that operate the left and right elevators 12a, 12b. A further example of a verification event may be a failure of one or both of the redundant hydraulic systems.

The verification event occurs at a start time, and at this start time and/or immediately prior to this start time (e.g., 0.5 to 0.25 seconds before), the left elevator 12a is at an initial rotational position and the right elevator 12b is at an initial rotational position. This and all positional and time information relating the left and right elevator tabs 10a, 10b and the left and right elevators 12a, 12b is stored as flight data (see, for example, stored flight data 216 of FIG. 10). However, the flight data may be real-time data (or may in part be real-time data) that may be available to the controller 204 and/or stored the memory 206 of FIG. 10. The occurrence of the verification event at the start time may be determined, for example, by the computer system 200 of FIG. 10, which will be described in more detail below. The computer system 200 may be particularly configured to automatically access stored flight data (e.g., over a communication network), where such access may be performed on a periodic basis determined by a schedule or based on a number of flights since the last analysis or some other event. In some examples, the computer system 200 accesses flight data based on a triggering event, whether in real-time during flight or after a flight. The computer system 200 may automatically search for the verification event data stored in the flight data and from there begin analysis and verification.

Figure 3A:
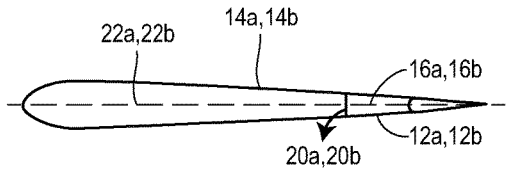
FIG. 3A is sectional view taken along line A-A and B-B of FIG. 2.

An example of an initial rotational position of the left elevator 12a is provided in FIG. 3A, which illustrates that a longitudinal axis 16a of the left elevator 12a is aligned (e.g., collinearly aligned) with a longitudinal axis 18a of the left elevator tab 10a. The longitudinal axis 16a of the left elevator 12a and the longitudinal axis 18a of the left elevator tab 10a may extend across the length of the left elevator tab 10a and the left elevator 12a, respectively along the sectional line A-A of FIG. 2. In some embodiments, the longitudinal axis 16a of the left elevator 12a and the longitudinal axis 18a of the left elevator tab 10a may bisect or substantially bisect the left elevator tab 10a and the left elevator 12a, respectively along the sectional line A-A of FIG. 2.

Figure 3B:
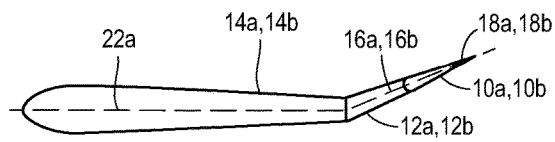
FIG. 3B is sectional view taken along line A-A and B-B of FIG. 2.
Figure 3C:
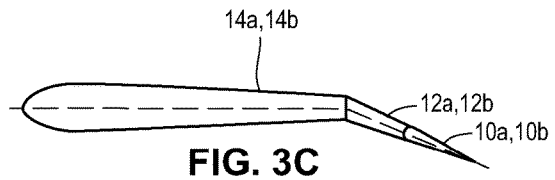
FIG. 3C is sectional view taken along line A-A and B-B of FIG. 2.

At (and/or just prior to) the start time, the left elevator tab 10a and the left elevator 12a act as a single control surface that rotates as a unit relative to a portion of the left horizontal stabilizer 14a about a left elevator rotational point 20a, as illustrated in FIG. 3A. Thus, at the initial rotational position of the left elevator 12a, the longitudinal axis 16a of the left elevator 12a and the longitudinal axis 18a of the left elevator tab 10a may be aligned with a longitudinal axis 22a of the left horizontal stabilizer 14a, as illustrated in FIG. 3A. In addition, the longitudinal axis 16a of the left elevator 12a and the longitudinal axis 18a of the left elevator tab 10a may form an acute angle (either clockwise or counterclockwise) with the longitudinal axis 22a of the left horizontal stabilizer 14a, as illustrated in FIGS. 3B and 3C.

Also at the start time and/or immediately prior to this start time (e.g., 0.5 to 0.25 seconds before), the right elevator 12b is at an initial rotational position and the right elevator 12b is at an initial rotational position. An example of an initial rotational position of the right elevator 12b is provided in FIG. 3A, which illustrates that a longitudinal axis 16b of the right elevator 12b is aligned (e.g., collinearly aligned) with a longitudinal axis 18b of the right elevator tab 10b. The longitudinal axis 16b of the right elevator 12b and the longitudinal axis 18b of the right elevator tab 10b may extend across the length of the right elevator tab 10b and the right elevator 12b, respectively along the sectional line B-B of FIG. 2. In some embodiments, the longitudinal axis 16b of the right elevator 12b and the longitudinal axis 18b of the right elevator tab 10b may bisect or substantially bisect the right elevator tab 10b and the right elevator 12b, respectively along the sectional line B-B of FIG. 2.

At (and/or just prior to) the start time, the right elevator tab 10b and the right elevator 12b act as a single control surface that rotates as a unit relative to a portion of the right horizontal stabilizer 14b about a right elevator rotational point 20b, as illustrated in FIG. 3A. Thus, at the initial rotational position of the right elevator 12b, the longitudinal axis 16b of the right elevator 12b and the longitudinal axis 18b of the right elevator tab 10b may be aligned with a longitudinal axis 22a of the right horizontal stabilizer 14b, as illustrated in FIG. 3A. In addition, the longitudinal axis 16b of the right elevator 12b and the longitudinal axis 18b of the right elevator tab 10b may form an acute angle (either clockwise or counterclockwise) with the longitudinal axis 22b of the right horizontal stabilizer 14b, as illustrated in FIGS. 3B and 3C.

At a first time, which occurs immediately or nearly immediately after the verification event, the left elevator tab 10a rotates relative to the left elevator 12a, while due to the intentional delay, the right elevator tab 10b does not rotate or displace relative to the right elevator 12b. The first time may occur after the start time but before the intentional delay expires, and the first time may be any length of time that allows a displacement (i.e., a statistically significant rotational displacement) of the left elevator 12a relative to the right elevator 12b to be detected by analyzing flight data. For example, the first time may occur between 0.0 to 1.0 second after the start time.

Figure 4A:
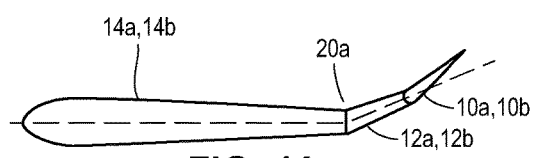
FIG. 4A is sectional view taken along line A-A and B-B of FIG. 2.
Figure 5A:
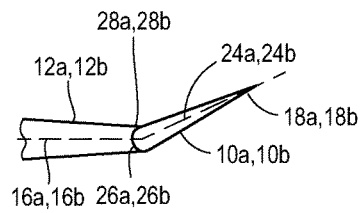
FIG. 5A is partial sectional view taken along line A-A and B-B of FIG. 2.
Figure 4B:
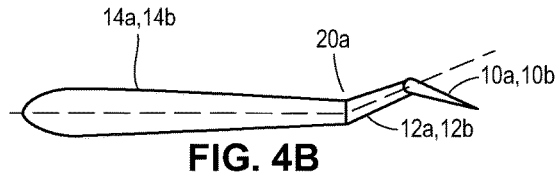
FIG. 4B is sectional view taken along line A-A and B-B of FIG. 2.
Figure 4C:
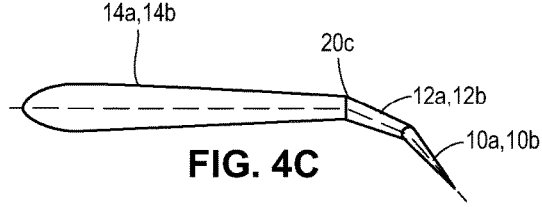
FIG. 4C is sectional view taken along line A-A and B-B of FIG. 2.
Figure 4D:
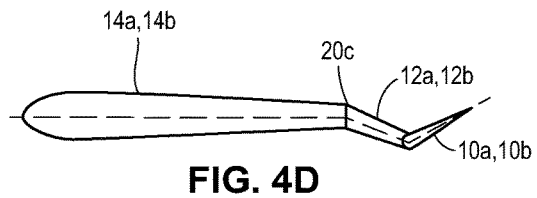
FIG. 4D is sectional view taken along line A-A and B-B of FIG. 2.

The left elevator tab 10a may rotatably displace in one of two directions relative to the left elevator 12 (or relative to a point on the left elevator). As illustrated in FIG. 5A (in which the left horizontal stabilizer 14a is eliminated for clarity), the left elevator tab 10a may rotate counter-clockwise about a left tab rotation point 24a that is disposed at or adjacent to a leading edge 26a of the left elevator tab 10a (and/or at or adjacent to a trailing edge 28a of the left elevator 12a). Such a counter-clockwise rotation of the left elevator tab 10a is involved in the "balance" function of the left elevator tab 10a when the left elevator 12a rotates clockwise relative to the left elevator 12a (or clockwise about the left elevator rotational point 20a), as illustrated in FIG. 4D. In addition, a counter-clockwise rotation of the left elevator tab 10a is involved in the "anti-balance" function of the left elevator tab 10a when the left elevator 12a rotates counter-clockwise relative to the left elevator 12a (or counter-clockwise about the left elevator rotational point 20a), as illustrated in FIG. 4A.

Figure 5B:
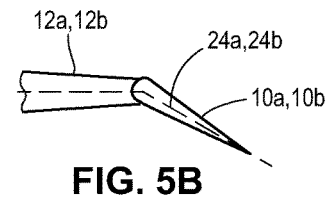
FIG. 5B is partial sectional view taken along line A-A and B-B of FIG. 2.

Referring to FIG. 5B (in which the left horizontal stabilizer 14a is eliminated for clarity), the left elevator tab 10a may also rotate clockwise about the left tab rotation point 24a. Such a clockwise rotation of the left elevator tab 10a is involved in the "balance" function of the left elevator tab 10a when the left elevator tab 10a rotates counter-clockwise relative to the left elevator 12a (or counter-clockwise about the left elevator rotational point 20a), as illustrated in FIG. 4B. In addition, a clockwise rotation of the left elevator tab 10a is involved in the "anti-balance" function of the left elevator tab 10a when the left elevator tab 10a rotates clockwise relative to the left elevator 12a (or clockwise about the left elevator rotational point 20a), as illustrated in FIG. 4B.

Figure 6A:
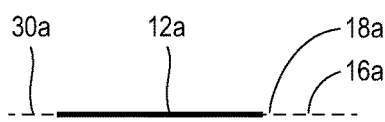
FIGS. 6A to 6C are partial sectional views taken along line A-A of FIG. 2 at a start time, a first time, and a second time, respectively.
Figure 6D:
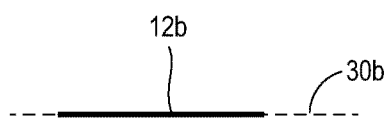
FIGS. 6D to 6F are partial sectional views taken along line B-B of FIG. 2 at a start time, a first time, and a second time, respectively.
Figure 6B:
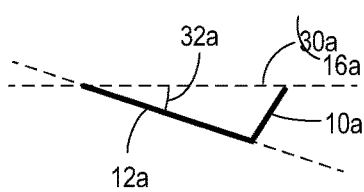

At this first time, the rotated or deployed left elevator tab 10a (in either "balance" or "anti-balance" mode) will have different aerodynamic characteristics that the right elevator 12b and the right elevator tab 10b. Accordingly, the left elevator 12a will be in a different relative position than the right elevator 12b at the first time when the flight data is analyzed. Specifically, as illustrated in FIG. 6A (with the "anti-balance" configuration illustrated as an example only), the longitudinal axis 16a of the left elevator 12a (and the longitudinal axis 18a of the left elevator tab 10a) extends through a left reference axis 30a at (or just prior to) the start time. At the first time, as illustrated in FIG. 6B, due to aerodynamic forces on the left elevator tab 10a, the longitudinal axis 16a of the left elevator 12a makes an angle 32a with the left reference axis 30a at (or just prior to) the start time, and this position of the left elevator 12a may be the first rotational position of the left elevator 12a at the first time. The angle 32a may be an acute angle that may be clockwise or counter-clockwise, and the value of the angle may depend on many variables, such as airspeed and/or initial angle of the left elevator 12a relative to the left horizontal stabilizer 14a, airspeed, for example.

At the start time (illustrated in FIG. 6D) and at the first time (illustrated in FIG. 6E), and due to the intentional delay, the right elevator tab 10 has not rotated relative to the right elevator 12a. That is, at both the start time and at the first time, the longitudinal axis 16b of the right elevator 12b (and the longitudinal axis 18b of the right elevator tab 10b) extends through a right reference axis 30b that is aligned with the left reference axis 30a of the left elevator 12a, and this position of the right elevator 12b may be the first rotational position of the right elevator 12b at the first time.

The right reference axis 30b of the right elevator 12b is aligned with (or corresponds to) the left reference axis 30a of the left elevator 12a in space. That is, a plane may extend through or along each of the left reference axis 30a and the right reference axis 30b, and the plane may be parallel to an axis or rotation of the left elevator 12a (that extends through the left elevator rotational point 20a of FIG. 3A) and an axis or rotation of the right elevator 12b (that extends through the right elevator rotational point 20b of FIG. 3A).

Figure 6E:

Accordingly, at the first time, the flight data may be analyzed to compare the first rotational position of the left elevator 12a (illustrated in FIG. 6B) to the first rotational position of the right elevator 12b (illustrated in FIG. 6E). This analysis of the flight data (as well as all analysis of flight data described in the following sections) may be performed by the computer system 200 of FIG. 10, which will be described in more detail below. If the first rotational position of the left elevator 12a at the first time is different than the first rotational position of the right elevator at the first time by at least a first value or within a first range, an alert may be issued that the left elevator tab 10a is operating properly. For example, if the angle 32a between the left reference axis 30a and the longitudinal axis 16a of the left elevator 12a is at a desired value or within a desired range (for example only, 0.5° to) 3.0°) and the angle 32b between the right reference axis 30b and the longitudinal axis 16b of the right elevator 12b is at a desired value or within a desired range (for example only, 0.0° to) 0.4°), an alert may be issued that the left elevator tab 10a is operating properly. An example of proper operation of the left elevator tab 10a between the start time and the first time can be found in FIGS. 6A and 6B.

In addition, or alternatively, the flight data may be analyzed to compare the first rotational position of the left elevator 12a (illustrated in FIG. 6B) to the position of the first rotational position of the left elevator 12a at or just prior to the start time (illustrated in FIG. 6A). If the first rotational position of the left elevator 12a at the first time is different than the rotational position of the left elevator 12a at the start time by at least a first value or within a first range, an alert may be issued that the left elevator tab 10a is operating properly. For example, if the angle 32a between the left reference axis 30a and the longitudinal axis 16a of the left elevator 12a is at a desired value or within a desired range (for example only, 0.5° to) 3.0°) at the first time, and the angle 32a between the left reference axis 30a and the longitudinal axis 16a of the left elevator 12a is at a desired value or within a desired range (for example only, 0.0° to 0.4°) at the start time, an alert may be issued that the left elevator tab 10a is operating properly.

Figure 7A:
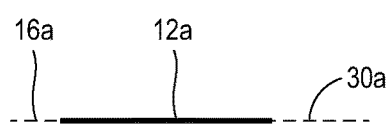
FIGS. 7A to 7C are partial sectional views taken along line A-A of FIG. 2 at a start time, a first time, and a second time, respectively.
Figure 7D:
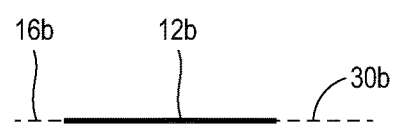
FIGS. 7D to 7F are partial sectional views taken along line B-B of FIG. 2 at a start time, a first time, and a second time, respectively.
Figure 7B:
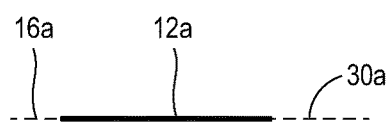
Figure 7E:
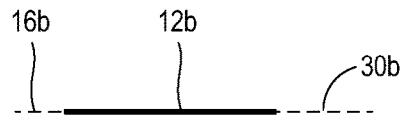
Figure 7C:
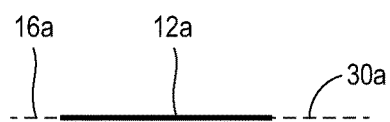
Figure 7F:
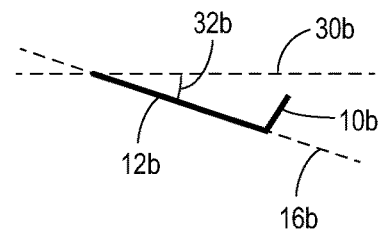

As illustrated in FIGS. 7A to 7F, analysis of the flight data may show that the left elevator tab 10a is not functional. For example, if analysis of the flight data shows the first rotational position of the left elevator 12a at the first time is not different than (or is equal or approximately equal to) the first rotational position of the right elevator 12b at the first time, the first alert may be issued. As another example, if analysis of the flight data shows that the angle 32a between the left reference axis 30a and the longitudinal axis 16a of the left elevator 12a is not at a desired value or within a desired range (for example only, 0.5° to 3.0°) at the first time (as illustrated in FIG. 7B) and/or if the difference in the angle 32a at the first time is not greater than a value or within a desired range (for example only, 0.5° to 3.0°) then the angel 32a at the start time (illustrated in 7A), then the first alert may be issued.

At the expiration of the intentional delay, which occurs at a second time, the right elevator tab 10a rotationally displaces relative to the right elevator 12a. The intentional delay may be any suitable length of time between operation of the left elevator tab 10a and the right elevator tab 10b. For example, the intentional delay may be 5 to 20 seconds, for example. More specifically, the intentional delay may be 5 to 20 seconds, or may be 10 seconds. If the intentional delay is triggered by the verification event that occurs at the start time, the second time is the value of the intentional delay.

Between the start time (and the first time) and just prior to the second time, the right elevator tab 10*b* and the right elevator 12*b* act as a single control surface that rotates as a unit relative to a portion of the right horizontal stabilizer 14*b* about a right elevator rotational point 20*b*, as illustrated in FIG. 3A. However, at the second time, the right elevator tab 10*b* may rotatably displace in one of two directions relative to the right elevator 12*b* (or relative to a point on the right elevator 12*b*). As illustrated in FIG. 5A (in which the right horizontal stabilizer 14*b* is eliminated for clarity), the right elevator tab 10*a* may rotate counter-clockwise about a right tab rotation point 24*b* that is disposed at or adjacent to a leading edge 26*b* of the right elevator tab 10*b* (and/or at or adjacent to a trailing edge 28*b* of the right elevator 12*b*). Such a counter-clockwise rotation of the right elevator tab 10*b* is involved in the "balance" function of the right elevator tab 10*b* when the right elevator tab 10*b* rotates clockwise relative to the right elevator 12*a* (or clockwise about the right elevator rotational point 20*b*), as illustrated in FIG. 4D. In addition, a counter-clockwise rotation of the right elevator tab 10*b* is involved in the "anti-balance" function of the right elevator tab 10*b* when the right elevator 12*b* rotates counter-clockwise relative to the right elevator 12*b* (or counter-clockwise about the right elevator rotational point 20*b*), as illustrated in FIG. 4A.

At or immediately after the expiration of the intentional delay (i.e., at the second time), the right elevator tab 10*b* makes (or finished making) a displacement that corresponds to the displacement of the left elevator tab 10*a*. That is, the right elevator tab 10*b* displaces (e.g., rotationally displaces) in the same direction and to the same degree as the left elevator tab 10*a* (illustrated in FIGS. 4A to 4D), with the only difference between the two being the timing of the start of the rotational displacement. For example, if the left elevator 12*a* is rotated counter-clockwise and the left elevator tab 10*a* is in the "anti-balance" position of FIG. 4A, than the right elevator 12*b* is rotated counter-clockwise (to the same degree as the left elevator 12*a*) and the right elevator tab 10*b* is in the "anti-balance" position of FIG. 4A (to the same degree as the left elevator tab 10*a*). Put another way, after the expiration of the intentional delay following the verification event, the left elevator 12*a* and the left elevator tab 10*a* should have a cross-section that is identical or nearly identical to the right elevator 12*b* and the right elevator tab 10*b*.

At this second time, the rotated or deployed right elevator tab 10*b* (in either "balance" or "anti-balance" mode) will have the same aerodynamic characteristics of the deployed left elevator tab 12*a* (also in either "balance" or "anti-balance" mode). Accordingly, the right elevator 12*b* will move from the first rotational position of FIG. 6E into the same (or nearly the same) relative position as the left elevator 12*a* at or slightly after the second time when the flight data is analyzed. Specifically, as illustrated in FIG. 6F (with the "balance" configuration illustrated as an example only), the longitudinal axis 16*b* of the right elevator 12*b* makes an angle 32*b* with the right reference axis 30*b* due to aerodynamic forces acting on the right elevator tab 10*b*, and this position of the right elevator 12*b* may be the second rotational position of the right elevator 12*b* at the second time. Because the position of the left elevator tab 10*a* and the left elevator 12*a* do not change from the first time to the second time, the second rotational position of the left elevator 12*a* at the second time is equal to or approximately equal to the first rotational position of the left elevator 12*a* at the first time. That is, the angle 32*a* does not change between the first time and the second time.

Consequently, at the second time, the flight data may be analyzed to compare the first rotational position of the right elevator 12*b* (illustrated in FIG. 6E) to the second rotational position of the right elevator 12*b* (illustrated in FIG. 6F). If the second rotational position of the right elevator 12*b* at the second time is different than the first rotational position of the right elevator 12*b* at the first time by at least a first value or within a first range, an alert may be issued that the right elevator 12*b* is operating properly. For example, if the angle 32*b* between the right reference axis 30*b* and the longitudinal axis 16*b* of the right elevator 12*b* is at a desired value or within a desired range (for example only, 0.0° to 0.4°) at the first time, and if the angle 32*b* between the right reference axis 30*b* and the longitudinal axis 16*b* of the right elevator 12*b* is at a desired value or within a desired range (for example only, 0.5° to 3.0°) at the second time, an alert may be issued that the right elevator tab 10*a* is operating properly. An example of proper operation of the right elevator tab 10*a* between the first time and the second time can be found in FIGS. 6E and 6F.

Figure 6C:
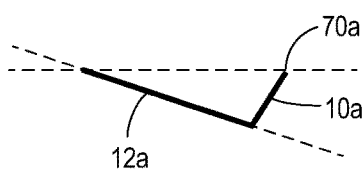
Figure 6F:
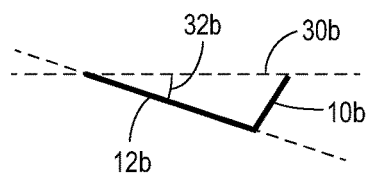

In addition (or alternatively), the flight data may be analyzed to compare the second rotational position of the right elevator 12*b* (illustrated in FIG. 6F) to the second rotational position of the left elevator 12*a* (illustrated in FIG. 6C). If the second rotational position of the right elevator 12*b* at the second time is equal to (or approximately equal to) or is the same as the second rotational position of the left elevator 12*a* at the second time (relative to the left reference axis 30*a* and the right reference axis 30*b*), the right elevator tab 10*b* is functioning properly. An alert may then be issued that the right elevator tab 10*b* is operating properly. For example, if the angle 32*b* between the right reference axis 30*b* and the longitudinal axis 16*b* of the right elevator 12*b* is at a desired value or within a desired range (for example only, 0.5° to 3.0°) at the second time, and if the angle 32*a* between the left reference axis 30*a* and the longitudinal axis 16*a* of the left elevator 12*a* is at a desired value or within a desired range (for example only, 0.5° to 3.0°) at the second time, an alert may be issued that the right elevator tab 10*a* is operating properly.

As illustrated in FIGS. 8A to 8F, analysis of the flight data may show that the left elevator tab 10*a* is functional but that the right elevator tab 10*b* is not functional. For example, at the second time, the flight data is analyzed to compare the first rotational position of the right elevator 12*b* (illustrated in FIG. 8E) to the second rotational position of the right elevator 12*b* (illustrated in FIG. 8F). If the second rotational position of the right elevator 12*b* at the second time is not different than (or is approximately equal to) the first rotational position of the right elevator 12*b* at the first time, a second alert may be issued that the right elevator 12*b* is not operating properly. For example, if the angle 32*b* between the right reference axis 30*b* and the longitudinal axis 16*b* of the right elevator 12*b* is at a desired value or within a desired range (for example only, 0.0° to 0.4°) at the first time, and if the angle 32*b* between the right reference axis 30*b* and the longitudinal axis 16*b* of the right elevator 12*b* is not at a desired value or within a desired range (for example only, 0.5° to 3.0°) at the second time, the second alert may be issued.

Figure 8A:
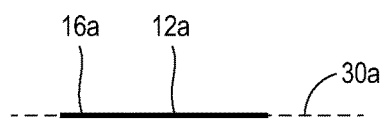
FIGS. 8A to 8C are partial sectional views taken along line A-A of FIG. 2 at a start time, a first time, and a second time, respectively.
Figure 8D:
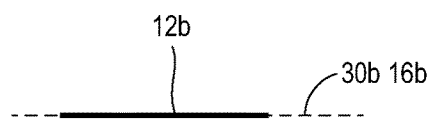
FIGS. 8D to 8F are partial sectional views taken along line B-B of FIG. 2 at a start time, a first time, and a second time, respectively.
Figure 8B:
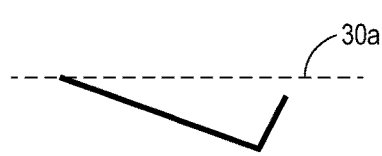
Figure 8E:
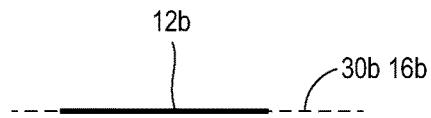
Figure 8C:
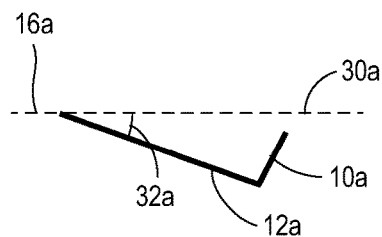
Figure 8F:
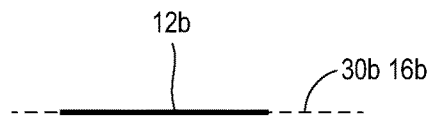
Figure 9A:
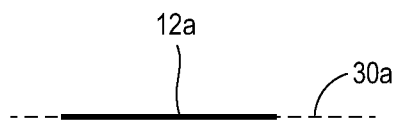
FIGS. 9A to 9C are partial sectional views taken along line A-A of FIG. 2 at a start time, a first time, and a second time, respectively.
Figure 9B:
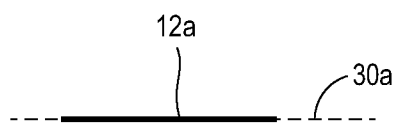
Figure 9C:
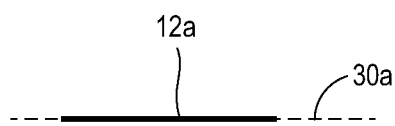
Figure 9D:
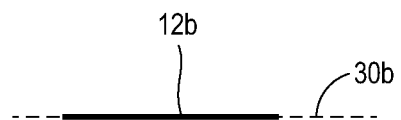
FIGS. 9D to 9F are partial sectional views taken along line B-B of FIG. 2 at a start time, a first time, and a second time, respectively.
Figure 9E:
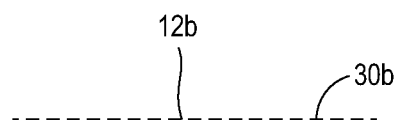
Figure 9F:
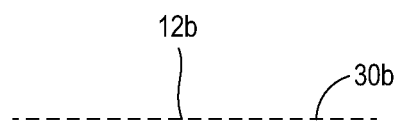

In addition (or alternatively), the flight data may be analyzed to compare the second rotational position of the right elevator 12*b* (illustrated in FIG. 8F) to the second rotational position of the left elevator 12a (illustrated in FIG. 8C). If the second rotational position of the right elevator 12b at the second time is not equal to (or approximately equal to) or within a range of (for example only, 0.0° to 0.4°) the second rotational position of the left elevator 12a at the second time (relative to the left reference axis 30a and the right reference axis 30b), the second alert may be issued. It may also be desired that the angle 32a between the left reference axis 30a and the longitudinal axis 16a of the left elevator 12a is at a desired value or within a desired range (for example only, 0.5° to 3.0°) before the second alert is issued.

As illustrated in FIGS. 9A to 9F, analysis of the flight data may show that the left elevator tab 10a is not functional and that the right elevator tab 10b is not functional. For example, as a first determining condition, if analysis of the flight data shows the first rotational position of the left elevator 12a at the first time (see FIG. 9B) is not different than (or is equal or approximately equal to) the first rotational position of the right elevator 12b (see FIG. 9E) at the first time, then the left elevator tab 10a is not functional. In addition, as a second determining condition, if analysis of the flight data shows the second rotational position of the right elevator 12a at the first time (see FIG. 9F) is not different than (or is equal or approximately equal to) the first rotational position of the right elevator 12b (see FIG. 9E) at the first time, then the right elevator tab 10b is not functional. If both the first and second determining condition are satisfied, then the a third alert is issued, with the third alert corresponding to a failure of both the left and right elevator tabs 10a, 10b.

An alternative analysis of the flight data may show that the left elevator tab 10a is not functional and that the right elevator tab 10b is not functional. For example, as a first determining condition, if the second rotational position of the left elevator 12a at the second time (see FIG. 9C) is within a range (0.0 to 0.4°) of the initial rotational position of the left elevator at the start time (see FIG. 9C) and if the second rotational position of the right elevator 12b at the second time (see FIG. 9F) is within the range (0.0 to 0.4°) of the initial rotational position of the right elevator 12b at the start time (see FIG. 9D), the third alert is issued a. The range is an angle 32a between the left reference axis 30a and the longitudinal axis 16a of the left elevator 12a or an angle 32b between the right reference axis 30b and the longitudinal axis 16b of the right elevator 12b.

The flight data may be analyzed and compared (and alerts may be issued) by any system or software (or combination of systems or software) known in the art. For example, the flight data may be analyzed and compared by an algorithm, such as a filter placed within the recorded flight data. In some systems, a computing device may be employed, and the computing device may include a memory and a processor, with logic stored on the memory and executable by the processor.

The flight data may be analyzed for proper operation of the left and right elevator tabs 10a, 10b at any time, and such an analysis may be formed at any suitable time. For example, the flight data may be analyzed for proper operation of the left and right elevator tabs 10a, 10b after every flight of a particular aircraft, or periodically over a sample of a fleet of aircraft.

In contemplated embodiments, the data may be analyzed in real time (either on board the aircraft and/or remote from the aircraft to determine proper operation of the left and right elevator tabs 10a, 10b. If either or both of the left and right elevator tabs 10a, 10b, are determined to be non-functional, a first, second, or third alert can be issued to the pilot, who can then take corrective action.

Figure 10:
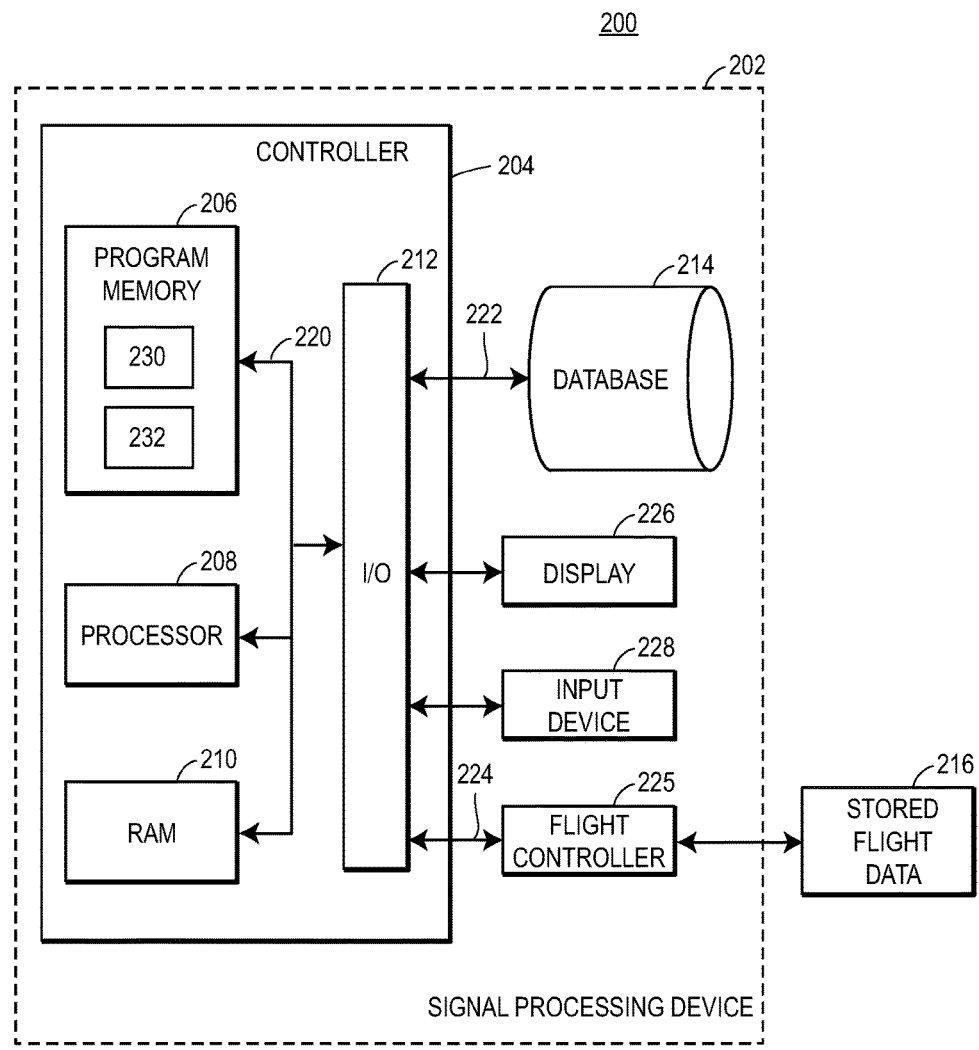
FIG. 10 is a schematic view of a system for assessing and verifying proper elevator tab operation in aircraft.

FIG. 10 illustrates a computer system 200 for assessing and verifying operation of elevator tabs. The computer system 200 accesses available stored flight data 216, such as a flight data database implemented as a Digital Flight Data Recorder ("DFDR"), a quick access recorder ("QAR") or other database, to assess operation of elevator tabs, in accordance with the examples described herein. The system 200 may be implemented in a desktop computer, laptop computer, tablet computer, mobile device, smart-phone, network-enabled device, cloud based server, an application server, a web server, etc. The computer system 200 may represent a single one of these processing machines or a distributed combination of such processing machines.

A signal-processing device 202 (or "signal processor" or "diagnostic device") is coupled the stored flight data 216 through a wired or wireless communication network. The signal-processing device 202 may have a controller 204 operatively connected to a database 214 via a link 222 connected to an input/output (I/O) circuit 212. It should be noted that, while not shown, additional databases may be linked to the controller 204 in a known manner. The controller 204 includes a program memory 206, one or more processors 208 (may be called microcontrollers or a microprocessors), a random-access memory (RAM) 210, and the input/output (I/O) circuit 212, all of which are interconnected via an address/data bus 220. It should be appreciated that although only one processor 208 is shown, the controller 204 may include multiple microprocessors 208. Similarly, the memory of the controller 204 may include multiple RAMs 210 and multiple program memories 206. Although the I/O circuit 212 is shown as a single block, it should be appreciated that the I/O circuit 212 may include a number of different types of I/O circuits. The RAM(s) 210 and the program memories 206 may be implemented as semiconductor memories, magnetically readable memories, and/or optically readable memories, for example. A link 224, which may include one or more wired and/or wireless (Bluetooth, WLAN, etc.) connections, may operatively connect the controller 204 to stored flight data 216 through the I/O circuit 212. In some examples, a (pneumatic, electronic, optical, or some combination thereof) flight controller 225 is coupled to the stored flight data 216, through the link 224, to allow for automated control of the operation of the elevator tabs in the event of a fault condition or other operation automatically determined.

The program memory 206 and/or the RAM 210 may store various applications (i.e., machine readable instructions) for execution by the processor 208. For example, an operating system may generally control the operation of the signal-processing device 202 and provide a user interface for the signal-processing device 202 to implement the stages of the method 100 of FIG. 1. The program memory 206 and/or the RAM 210 may also store a variety of subroutines 232 for accessing specific functions of the signal-processing device 202. By way of example, and without limitation, the subroutines 232 may include, among other things: a subroutine for determining an occurrence of a verification event that includes movement of a first elevator tab (e.g., a left elevator tab) relative to a first elevator (e.g., the left elevator) and a second elevator tab (e.g., a right elevator tab) relative to a second elevator (e.g., a right elevator), wherein the verification event occurs at a start time, wherein the first elevator is at an initial rotational position and the second elevator is at an initial rotational position at the start time; a subroutine for determining a first rotational position of the first elevator at a first time and a first rotational position of the second elevator at the first time, the first time occurring after the start time; a subroutine for comparing the first rotational position of the first elevator at the first time to the first rotational position of the second elevator at the first time; a subroutine to issue a first alert associated with the first elevator tab if the first rotational position of the first elevator at the first time is not different than the first rotational position of the second elevator at the first time by at least a first value or by a first range; a subroutine to compare the second rotational position of the first elevator at the second time to the second rotational position of the second elevator at the elevator at the second time; a subroutine to issue a second alert associated with the second elevator tab if the second rotational position of the second elevator at the second time is not within a second range of the second rotational position of the first elevator at the second time; and a subroutine to determine that if (a) the second rotational position of the first elevator at the second time is within a third range of the initial rotational position of the first elevator at the start time and (b) the second rotational position of the second elevator at the second time is within the third range of the initial rotational position of the second elevator at the start time, a third alert is issued associated with both the first elevator tab and the second elevator tab.

As previously explained, the subroutines 232 may include a subroutine to generate an alert and/or alarm condition, for example, using the display 226. That alert and/or alarm condition may be displayed as a web page, mobile device alert, tactile alert or alarm (e.g., via a vibrating function of a smartwatch or smartphone), or any other suitable visual and/or tactile (haptic) display. The subroutines 232 may communicate this alert and/or alarm condition to a separate computing device connected to the system 200 through a network connection. Such separate computing devices may include a server, laptop computer, handheld computer, monitor, mobile device such as a cellular phone or Wi-Fi-enabled tablet, or other device. The subroutines 232 may include a subroutine to communicate the alert or other analysis thereof to a flight control system for operation of the elevators, elevator tabs, or other system to compensate for a detected fault condition. The subroutines 232 may also include other subroutines, for example, implementing software keyboard functionality, interfacing with other hardware in the signal-processing device 202, etc. The subroutines 232 may also include other subroutines, for example, implementing software keyboard functionality, interfacing with other hardware in the signal-processing device 202, etc. The program memory 206 and/or the RAM 210 may further store data related to the configuration and/or operation of the signal-processing device 202, and/or related to the operation of the one or more subroutines 232. For example, the data may be data gathered by in the flight data 216, data determined and/or calculated by the processor 208, etc. In addition to the controller 204, the signal-processing device 202 may include other hardware resources. The signal-processing device 202 may also include various types of input/output hardware such as a visual display 226 and input device(s) 228 (e.g., keypad, keyboard, etc.). In an embodiment, the display 226 is touch-sensitive, and may cooperate with a software keyboard routine as one of the software routines 232 to accept user input. It may be advantageous for the signal-processing device 202 to communicate with a broader flight control systems (not shown) through any of a number of known networking devices and techniques.

Figure 11:
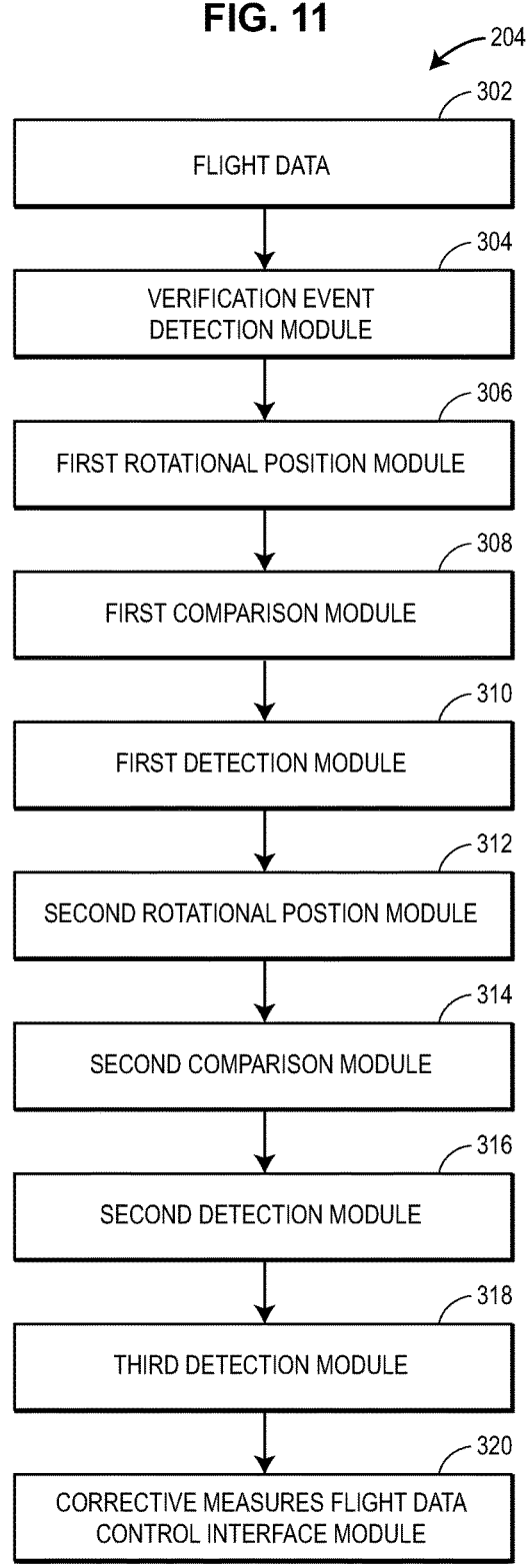
FIG. 11 is a schematic view of modules of a process of the system of the embodiment of FIG. 10.

The controller 204 may include any number of modules to analyze flight data to verify proper operation of the left and right elevator tabs 10a, 10b, and these modules may represent software code or hardware or stored instructions that implement the techniques described herein. For example, as illustrated in FIG. 11, the controller 204 may include a flight data module 302 that includes the aircraft's (or multiple aircrafts') flight data. The controller 204 may also include a verification event detection module 304 that analyzes the flight data to determine the occurrence of a verification event that includes movement of a first elevator tab (e.g., the left elevator tab 10a) relative to the first elevator (e.g., the left elevator 12a) and the second elevator tab (the right elevator tab 10b) relative to the second elevator (the right elevator 12b). The verification event detection module 304 may also determine an initial rotational position of the first elevator and an initial rotational position of the second elevator at a start time, which is the time or point in time that the verification event occurred.

The controller 204 may additionally include a first rotational position module 306 to analyze the flight data to determine a first rotational position of the first elevator at a first time and a first rotational position of the second elevator at the first time, the first time occurring after the start time.

The controller 204 may include a first comparison module 308 to compare the first rotational position of the first elevator at the first time to the first rotational position of the second elevator at the first time.

The controller 204 may include a first detection module 310 that issues a first alert associated with the first elevator tab if the first rotational position of the first elevator at the first time is not different than the first rotational position of the second elevator at the first time by at least a first value or by a first range. The first detection module 310 may also issue a first alert based on other parameters described earlier to determine if the first elevator tab is functional.

The controller 204 may additionally include a second rotational position module 312 to analyze the flight data to determine a second rotational position of the first elevator at a second time and a second rotational position of the second elevator at the second time. The second time occurs after the first time and the difference between the start time and the second time being equal to an intentional delay between functionality of the first elevator tab and the second elevator tab.

The controller 204 may include a second comparison module 314 to compare the second rotational position of the first elevator at the second time to the second rotational position of the second elevator at the elevator at the second time.

The controller 204 may include a second detection module 316 that issues a second alert associated with the second elevator tab if the second rotational position of the second elevator at the second time is not within a second range of the second rotational position of the first elevator at the second time. The second detection module 316 may also issue a second alert based on other parameters described earlier to determine if the second elevator tab is functional.

The controller 204 may include a third detection module 318 that issues a third alert associated with both the first elevator tab and the second elevator tab if (a) the second rotational position of the first elevator at the second time is within a third range of the initial rotational position of the first elevator at the start time and (b) the second rotational position of the second elevator at the second time is within the third range of the initial rotational position of the second elevator at the start time. The third detection module 318 may also issue a third alert based on other parameters described earlier to determine if both the first and second elevator tabs are functional.

The controller 204 may also include an optional corrective measures flight data control interface module 320 that may initiate corrective measures based on the issuance of a first, second, and/or third alert. The corrective measures may provide information that identifies the fault and the aircraft, for example. The corrective measures may also be in-flight instructions or relating to the first, second, and/or third alert.

The controller 204 may analyze the flight data after a flight has occurred or may perform real-time analysis of flight data. Although the modules 312-320 are represented as discrete, independent modules in FIG. 11, a single module (or multiple modules) could perform any of the functionalities associated with any of the modules provided in FIG. 11.

While various embodiments have been described above, this disclosure is not intended to be limited thereto. Variations can be made to the disclosed embodiments that are still within the scope of the appended claims. For example, the first elevator tab may be the right elevator tab disposed at an end portion of the first elevator, which is the right elevator of the aircraft. Correspondingly, the second elevator tab may be the left elevator tab disposed at an end portion of the second elevator, which may be the left elevator of the aircraft.

What is claimed is:

1. A method of verification of proper operation of a first elevator tab disposed at an end portion of a first elevator of an aircraft and a second elevator tab disposed at an end portion of a second elevator of the aircraft, the method comprising:
   determining the occurrence of a verification event that includes movement of the first elevator tab relative to the first elevator and the second elevator tab relative to the second elevator, wherein the verification event occurs at a start time, wherein the first elevator is at an initial rotational position and the second elevator is at an initial rotational position at the start time;
   determining a first rotational position of the first elevator at a first time and a first rotational position of the second elevator at the first time, the first time occurring after the start time;
   comparing the first rotational position of the first elevator at the first time to the first rotational position of the second elevator at the first time;
   when the first rotational position of the first elevator at the first time is not different than the first rotational position of the second elevator at the first time by at least a first value or by a first range, issuing a first alert associated with the first elevator tab;
   determining a second rotational position of the first elevator at a second time and a second rotational position of the second elevator at the second time, the second time occurring after the first time and the difference between the start time and the second time being equal to an intentional delay between functionality of the first elevator tab and the second elevator tab;
   comparing the second rotational position of the first elevator at the second time to the second rotational position of the second elevator at the elevator at the second time;
   when the second rotational position of the second elevator at the second time is not within a second range of the second rotational position of the first elevator at the second time, issuing a second alert associated with the second elevator tab; and
   when (a) the second rotational position of the first elevator at the second time is within a third range of the initial rotational position of the first elevator at the start time and (b) the second rotational position of the second elevator at the second time is within the third range of the initial rotational position of the second elevator at the start time, issuing a third alert associated with both the first elevator tab and the second elevator tab.

2. The method of claim 1, wherein the first elevator is a left elevator and the first elevator tab is a left elevator tab, and the second elevator is a right elevator and the second elevator tab is a right elevator tab.

3. The method of claim 1, wherein the intentional delay is between 6 and 20 seconds.

4. The method of claim 3, wherein the intentional delay is between 8 and 14 seconds.

5. The method of claim 1, wherein the verification event is moving the aircraft's flap handle out of an "up" detent.

6. The method of claim 1, wherein the verification event is a detection of a failure of one or both of a first hydraulic system and a second hydraulic system of the aircraft.

7. The method of claim 1, wherein the first range is between about 0.5° and about 3.0°.

8. The method of claim 1, wherein the second range is between about 0.0° and about 0.4°.

9. The method of claim 1, wherein the third range is between about 0.0° and about 0.4°.

10. A system to analyze flight data to verify proper operation of a first elevator tab disposed at an end portion of a first elevator of an aircraft and a second elevator tab disposed at an end portion of a second elevator of the aircraft, the system comprising:
    a computing device including a memory and a processor, the memory adapted to store non-transitory computer executable instructions, wherein the non-transitory computer executable instructions, when executed by the processor, cause the system to:
    analyze the flight data to determine the occurrence of a verification event that includes movement of the first elevator tab relative to the first elevator and the second elevator tab relative to the second elevator, wherein the verification event occurs at a start time, wherein the first elevator is at an initial rotational position and the second elevator is at an initial rotational position at the start time;
    analyze the flight data to determine a first rotational position of the first elevator at a first time and a first rotational position of the second elevator at the first time, the first time occurring after the start time;
    compare the first rotational position of the first elevator at the first time to the first rotational position of the second elevator at the first time;
    wherein when the first rotational position of the first elevator at the first time is not different than the first rotational position of the second elevator at the first time by at least a first value or by a first range, issue a first alert associated with the first elevator tab;
    analyze the flight date to determine a second rotational position of the first elevator at a second time and a second rotational position of the second elevator at the second time, the second time occurring after the first time and the difference between the start time and the second time being equal to an intentional delay between functionality of the first elevator tab and the second elevator tab;

compare the second rotational position of the first elevator at the second time to the second rotational position of the second elevator at the elevator at the second time;

wherein when the second rotational position of the second elevator at the second time is not within a second range of the second rotational position of the first elevator at the second time, issue a second alert associated with the second elevator tab; and wherein when (a) the second rotational position of the first elevator at the second time is within a third range of the initial rotational position of the first elevator at the start time and (b) the second rotational position of the second elevator at the second time is within the third range of the initial rotational position of the second elevator at the start time, issue a third alert associated with both the first elevator tab and the second elevator tab.

11. The system of claim 10, wherein the first elevator is a left elevator and the first elevator tab is a left elevator tab, and the second elevator is a right elevator and the second elevator tab is a right elevator tab.

12. The system of claim 10, wherein the intentional delay is between 6 and 20 seconds.

13. The system of claim 12, wherein the intentional delay is between 8 and 14 seconds.

14. The system of claim 10, wherein the verification event is moving the aircraft's flap handle out of an "up" detent.

15. The system of claim 10, wherein the verification event is a detection of a failure of one or both of a first hydraulic system and a second hydraulic system of the aircraft.

16. The system of claim 10, wherein the first range is between about 0.5° and about 3.0°.

17. The system of claim 10, wherein the second range is between about 0.0° and about 0.4°.

18. The system of claim 10, wherein the third range is between about 0.0° and about 0.4°.

* * * * *

UNITED STATES PATENT AND TRADEMARK OFFICE
CERTIFICATE OF CORRECTION

PATENT NO. : 9,824,513 B2
APPLICATION NO. : 15/099547
DATED : November 21, 2017
INVENTOR(S) : Paul Bowman et al.

Page 1 of 1

It is certified that error appears in the above-identified patent and that said Letters Patent is hereby corrected as shown below:

In the Claims

At Column 16, Line 60, "flight date" should be -- flight data --.

Signed and Sealed this
Fifteenth Day of May, 2018

Andrei Iancu
*Director of the United States Patent and Trademark Office*